(12) United States Patent
Elliott

(10) Patent No.: US 6,987,726 B1
(45) Date of Patent: Jan. 17, 2006

(54) MANAGEMENT OF DUPLICATED NODE IDENTIFIERS IN COMMUNICATION NETWORKS

(75) Inventor: Brig Barnum Elliott, Arlington, MA (US)

(73) Assignee: BBNT Solutions LLC, Camrbidge, MA (US)

( * ) Notice: Subject to any disclaimer, the term of this patent is extended or adjusted under 35 U.S.C. 154(b) by 0 days.

(21) Appl. No.: 09/576,273

(22) Filed: May 22, 2000

(51) Int. Cl.
H04J 3/14 (2006.01)

(52) U.S. Cl. ............... 370/217; 370/221; 370/225; 370/252; 370/254; 370/395.21; 370/400

(58) Field of Classification Search ........ 370/216–228, 370/236, 252, 254–257, 225, 395.21, 390, 370/428
See application file for complete search history.

(56) References Cited

U.S. PATENT DOCUMENTS

| | | | |
|---|---|---|---|
| 4,718,002 A | 1/1988 | Carr | 364/200 |
| 5,093,824 A | 3/1992 | Coan et al. | 370/16 |
| 5,243,592 A | 9/1993 | Perlman et al. | 370/17 |
| 5,768,256 A * | 6/1998 | Allen et al. | 370/218 |
| 5,850,592 A | 12/1998 | Ramanathan | 455/7 |
| 5,881,246 A | 3/1999 | Crawley et al. | 395/200.68 |
| 5,913,921 A | 6/1999 | Tosey et al. | 709/220 |
| 5,960,086 A * | 9/1999 | Atalla | 380/44 |
| 6,507,800 B1 * | 1/2003 | Sheu | 702/117 |

OTHER PUBLICATIONS

"Link-State Routing," John Moy, Ch. 5, "Routing in Communications Networks," ed. Martha Steenstrup, Prentice Hall, 1995.

"Packet Radio Routing," Gregory S. Lauer, Ch. 11, "Routing in Communications Networks," ed. Martha Steenstrup, Prentice Hall, 1995.

"Packet Radio Network Routing Algorithms: A Survey," J.J. Hahn et al., IEEE Communications Magazine, vol. 22, No. 11, Nov. 1984, pp. 41-47.

"The Organization of Computer Resources into a Packet Radio Network," R.E. Kahn, IEEE Trans. On Communications, vol. COM-25, No. 1, Jan. 1977, pp. 169-178.

"Analysis of Routing Strategies for Packet Radio Networks," J.J. Garcia Lune Aceves et al., Proc. Of the IEEE INFOCOM '85, Washington, DC, Mar. 1985, 292-302.

"The DARPA Packet Radio Network Protocols," J. Jubin et al., Proc. Of the IEEE, vol. 75, No. 1, Jan. 1987, pp. 21-32.

* cited by examiner

*Primary Examiner*—Dang Ton
*Assistant Examiner*—Inder Pal Mehra
(74) *Attorney, Agent, or Firm*—Fish & Neave IP Group Ropes & Gray LLP

(57) ABSTRACT

In a communication network in which each of plural nodes (110 . . . 120) has an assigned node identifier, a node signature (step 505) is generated by each node from an identifier of a component (e.g., 201) of the node or from statistical processing of information in the node. Each node distributes information data (300) that includes its assigned node identifier and its generated node signature (405). The node signatures in information data at a node having the same node identifier are compared (step 710) to detect whether the node signatures for the same node identifier are different. The operation of the network is modified (e.g., 640, 725, 825 or 915) in response to detection of different node signatures for nodes having the same node identifier. The modification (725) may include removing all but one node of the nodes of the same node identifier detected as having different node signatures from network participation.

70 Claims, 8 Drawing Sheets

MANAGEMENT OF DUPLICATED NODE IDENTIFIERS IN COMMUNICATION NETWORKS

BACKGROUND OF THE INVENTION

1. Field of the Invention

The invention relates to a communication network in which information is routed through an array of interconnected nodes and more particularly to the identification of nodes in messaging in ad hoc networks.

2. Related Art

In a communication system in which communications among subscribers are routed through a network of interconnected routers or nodes to provide required communication paths, each node includes a database which stores information on the network configuration obtained from messages exchanged among the nodes. The network information stored in the database in each node provides a representation of the network configuration that is used by protocols controlling the node operation to direct data traffic through the network from a source node to a destination node.

An ad hoc communication network, for example, has both routing nodes capable of network routing functions and nodes that are endpoints, sources or destinations, for data traffic. All of the ad hoc network nodes are equipped with communication transceivers. Further, all nodes execute processes and protocols that enable the nodes to locate all of the other nodes, to determine the paths through the network for data traffic between designated sources and destinations, and to detect and repair disruptions in the network as communication paths characteristics vary over time and nodes move and fail for various reasons. The network configuration representation stored in the databases of the nodes is utilized to perform the processes and protocols executed at the network nodes.

A node identifier that is unique is assigned to identify a single router, switch or host in the network or to identify a communication interface in a router, switch or host. The information data in the messages exchanged among nodes performing the communication protocols is stored in units according to the node identifier of the nodes issuing the messages in the node database. During operation of the network, a routing protocol uses the unique node identifier to identify the node that issued a routing update or other routing information. A forwarding protocol may provide a list of nodes according to their unique node identifiers that should be traversed to deliver a packet across the network and a channel access protocol may embed the unique node identifier as part of its channel access arrangement.

In the event that the assigned node identifiers are not unique due to a configuration error, the same node identifier may be used for different nodes in the network. The sharing of unique node identifiers interferes with proper operation of the networking protocols. For example, the duplicated node identifiers will not permit Link State and Distance Vector routing protocols to accurately discern paths through the network so that data packets are misrouted. Additionally, channel access does not prevent contention or collisions when two nodes in a wireless network that are within wireless range of each other have the same assigned node identifier and each responds to a channel access request that includes the duplicated unique node identifier. Accordingly, it is necessary to assure detection and correction of duplicated node identifiers in communication networks to avoid failure in node operation.

SUMMARY OF THE INVENTION

The invention is directed to a communication system in which plural nodes are coupled together to form a network for communications among plural subscribers. Each node in the network is assigned a node identifier which identifier is included in information data messaging among the nodes. The information data received by a node is stored in a database of the node according to the node identifiers. The information data issuing node and networking protocols are performed on the basis of the node identifiers.

According to the invention, each node generates a node signature that is included in a message issued by the node together with the node's assigned node identifier. The node identifier and node signature message issued by each node is distributed to the other nodes of the network. The node signatures in all the received identification messages having the same node identifier are compared and the occurrence of nodes having different node signatures and the same unique node identifier is detected. The operation of the communication network are modified in response to nodes having the same node identifier being detected as having different node signatures.

According to one aspect of the invention, the node signature is generated according to an identifier of a component of the node.

According to another aspect of the invention, the node signature is generated according to a quasi-random processing of information received from the network.

According to yet another aspect of the invention, the node signature is generated according to timing of a predetermined variable timed event of the network.

According to yet another aspect of the invention, information of all of the nodes with the same node identifier detected as having different node signatures is ignored by the detecting node.

According to yet another aspect of the invention, information of all but one of the detected nodes are ignored for a predetermined time.

According to yet another aspect of the invention, all of the nodes of the same node identifier detected as having different node signatures are removed from participation in the network.

According to yet another aspect of the invention, one of the nodes detected as having the same node identifier with different node signatures is selected for network participation and the nodes of the same node identifier detected as having different node signatures except the selected node are removed from network participation.

According to yet another aspect of the invention, the node signature is a numeric value and the node signatures of the nodes detected as having the same node identifier with different node signatures are arranged in an ordered list. The node having a node signature in a predetermined place in the ordered list is selected and the nodes of the same node identifier detected as having different node signatures except the selected node are removed from participation in the network.

According to yet another aspect of the invention, the node signature is a numeric value, the detected node with the lowest numeric value node signature of the nodes of the same node identifier detected as having different node signatures is selected and the all of the other nodes of the same node identifier detected as having different node signatures except the selected node are removed from participation in the network.

According to yet another aspect of the invention, the node signatures of any nodes having the node's own node identifier are compared and the node ceases transmission of data upon detection of different node signatures for the node's own node identifier.

According to yet another aspect of the invention, the node signatures have numerical values and the node signatures of the network nodes having the node's own node identifier are compared. The node removes itself from network participation or ceases transmission of data upon detection of different node signatures for the node's own node identifier when the node's own node signature is not the lowest arithmetic value node signature.

In an embodiment of the invention, each node of a communication network includes a message issuing unit, a message receiving unit and a database. The node is assigned a unique node identifier and generates a node signature having a numeric value determined from a node component identifier or by processing received quasi-random information. Each node issues an identifying message including the assigned node identifier and the node signature of the node from its message issuing unit that is distributed to all other nodes. The identifying messages received from the other nodes are stored in the node database. The node signatures for the same node identifier in the database are compared and the nodes having the same node identifier but different node signatures are detected. The numeric values of the detected nodes are compared and the node with the lowest arithmetic numeric value is selected for network participation. The other detected nodes are removed from the network.

DETAILED DESCRIPTION OF THE PREFERRED EMBODIMENTS

Figure 1:
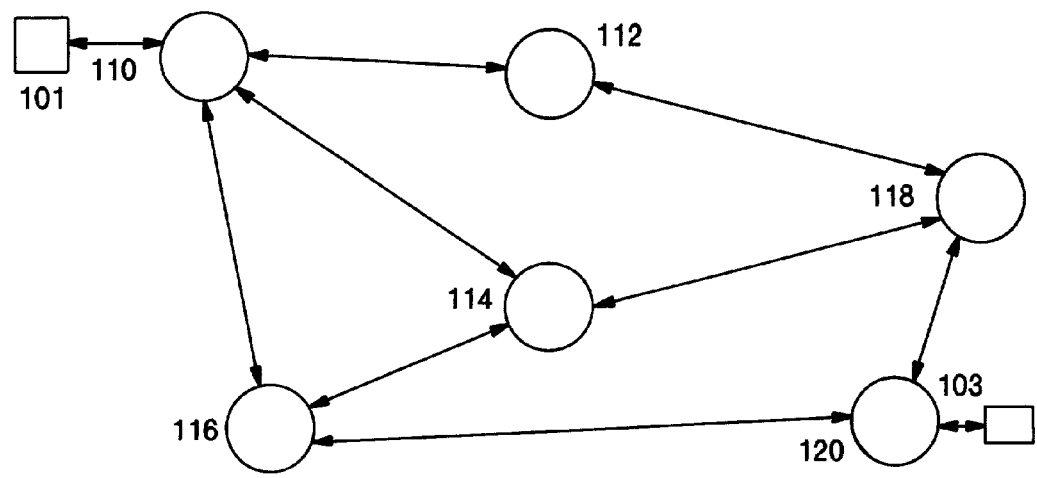
FIG. 1 depicts a general block diagram of a communication network that employs the invention.

FIG. 1 depicts a communication network for communicating data among data units coupled through linked routers. In FIG. 1, each router in the array of routers 110, 112, 114, 116, 118 and 120 is linked to other routers to form a communication network. The network provides communication paths for data traffic from a source such as a host computer 101 coupled to the router 110 to a data destination such as a data unit 103 coupled to the router 120. Other routers shown in FIG. 1 which may have data units of various types connected thereto arrange themselves to operate as intermediate nodes of a communication path connecting the router 110 to the router 120 for the connection between host computer 101 and data unit 103. The communication paths through the network of FIG. 1 are determined by the network routers based on network connection information obtained by exchange of connection information among the routers.

The network information about other routers received at a router node is processed and stored in a database that includes a representation of some of some or all of the nodes in the network and various paths by which messages should be sent through the network. This routing information is periodically updated or updated in response to network events by a routing protocol so that each router has the current routing information of the network stored in its database. If the network of FIG. 1 has mobile type routers coupled together by wireless links, the links among the routers at nodes of the network change frequently due to movement of the mobile routers and to environmental factors. Accordingly, frequent messaging among the routers is required to maintain the network information databases in the nodes updated.

Figure 2:
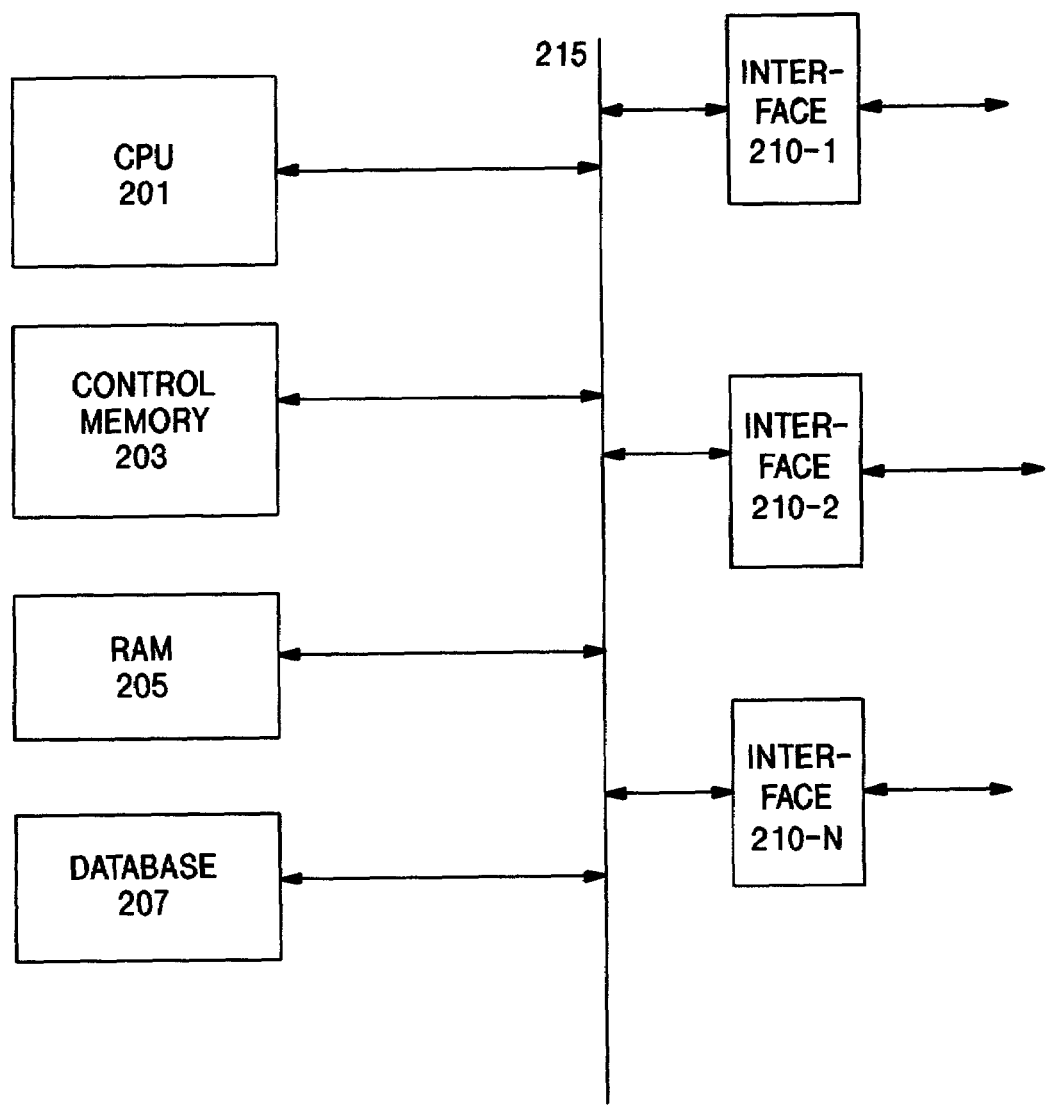
FIG. 2 depicts a block diagram of a node in the communication network of FIG. 1.

FIG. 2 is a block diagram of a router that operates as a node in the communication network of FIG. 1. The router shown in FIG. 2 includes a control unit CPU 201, a control memory 203, a RAM 205, a database 207, interfaces 210-1, 210-2 through 210-N, all of which are coupled together by a bus 215. The control memory 203 stores the operating protocols, database control programs and other processing programs required for router functioning. RAM 205 stores data needed for processing of control functions and Database 207 stores the network information directs the formation, maintenance and modification of communication paths. Interfaces 210-1 through 210-N receive data from and send data to neighboring routers.

The routers in the network of FIG. 1 receive messages from neighboring routers to which they are linked. For example, the router 114 is linked to routers 110, 116 and 118. The router 114 may be connected to the router 110 through its interface 210-1, to the router 116 through its interface 210-2 and to the router 118 through its interface 210-N. A routing message received by the router 114 from the router 110 through the interface 210-1 is initially stored in the RAM 205 and is processed in the CPU 201 according to protocols stored in control memory 203. As a result of the processing in the CPU 201, information data units of the received message are stored in the database 207. Since it is necessary for each router to have at least a substantially consistent network information representation in its database and the network configuration may change frequently, messages are exchanged among the routers so that each maintains the substantially consistent database stored network information. Accordingly, messages received by a node may be routing updates for updating the network information stored in the database 201. The messages may be routing data for setting up a communication path, data traffic, etc. and may include message portions originally issued by non-neighboring routers. A message may also be a composite of information data units relating to routing, network information updates and data traffic.

Each router is a node in the communication network of FIG. 1 and is assigned a unique node identifier that is used in messaging among the nodes. If two or more distinct nodes are erroneously assigned the same node identifier, many of the protocols required for performing network operations fail. For example, Link State and Distance Vector routing protocols do not accurately discern communication paths through a network if two or more nodes are assigned the same node identifier. As a result, packets may be misrouted. Channel access arrangements will not properly prevent contention or collisions if two nodes with duplicated node identifiers are within range and each responds to a channel access request.

In accordance with the invention, each router node performs a process that generates a node signature that is independent of the assigned node identifier so that the node is identified by its node signature independently of the assigned node identifier. The node then issues node identifying information in a message having both the node identifier and the node signature or includes the node identifying information in another message. Each node receives the node identifying information from all other nodes through the network. The node signatures for a given node identifier in a database are compared to detect the presence of different node signatures for the same node identifier to avoid failure in protocol processing and node accessing as well as misdirected data packets.

Figure 5:
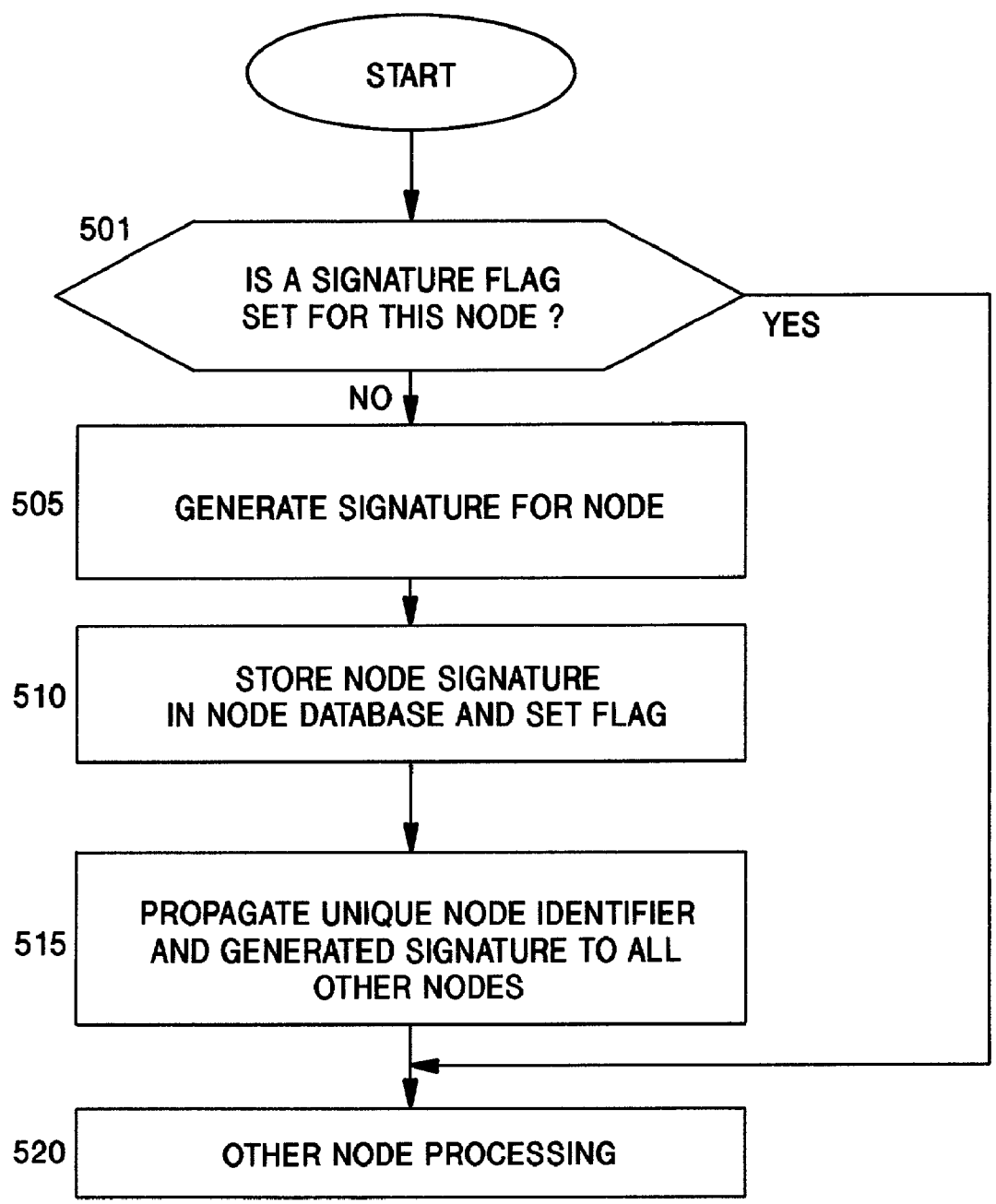
FIG. 5 is a flow chart for generating a node signature in the node depicted in FIG. 2.

FIG. 5 is a flow chart showing the generation of a node signature in a node which is performed by the CPU 201 under control of program instruction codes stored in the control memory 203. As indicated in FIG. 5, the CPU 201 first determines whether a node signature flag has been set in decision step 501. If the flag has been set, a node signature has been generated previously and control is passed to step 520 for other processing. Upon determining that the node signature flag is not set in the step 501, a signature generation process is performed in step 505 using a predetermined numerical value available to the node from identifying numerals of node components or by generating a numerical value by a quasi-random process in the node or in the network. In this way, the signature is generated to be independent of the assigned node identifier.

In particular, the node signature may be generated by instruction codes controlling the CPU 201 to read the unique identification numeral of a component of the node such as the CPU, the control memory or the RAM. The signature may also be obtained by processing information from a communication channel to determine a hash function in a range of predetermined quasi-random numerals or by monitoring the timing of an accurately clocked predetermined variable time operation of the node, e.g., reading memory locations or accessing pre-assigned communication channels. Once the node signature is determined, it is stored in the database 207 of the node and the node signature flag is set (step 510). A message that includes the assigned node identifier and the unique node signature is then issued and propagated to all other nodes in step 515 and other processing is performed in the step 520.

Figure 3:
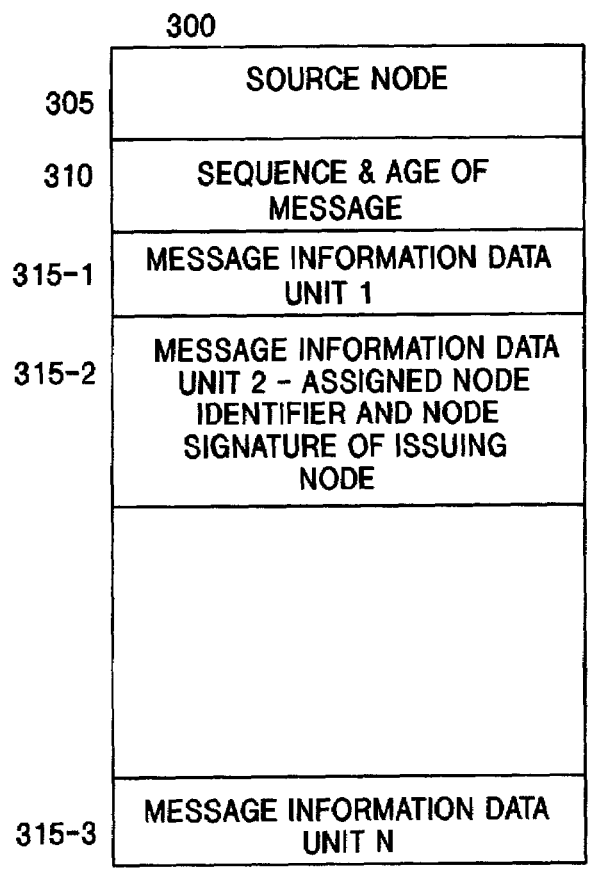
FIG. 3 illustrates the structure of a set of information data messages issued by a node in the communication network of FIG. 1.

FIG. 3 is a diagram of a message issued by a router in the network of FIG. 1. Referring to FIG. 3, a message 300 includes a source node unit 305, sequence number and age code units for the message, and information data units 315-1, 315-2 through 315-N of the message. In a message issued by the node 110, the destination node identifier may be the node 114 and the source node is 110. The sequence and age codes of unit 310 provide information on whether a message has been superseded by a later message and the age code provides limited lifetime so that a message is removed after a predetermined time. Each information data unit of the message is processed and inserted in the database of the node.

Figure 4:
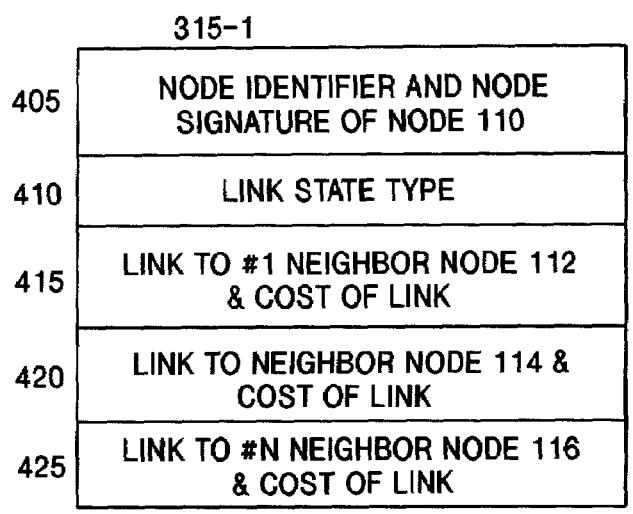
FIG. 4 illustrates a node identifying message in the message structure of FIG. 3.

Information data unit 1 of the message 300 in FIG. 3, for example, may be a routing update issued by the node 110 and received by the router 114. FIG. 4 shows a specific example for a link state routing protocol. As shown in FIG. 4, Portion 405 of the update provides the issuing node's node identifier and node signature (e.g., the node 110). Portion 410 identifies the update as a link state type and Portions 415, 420 and 425 identify the nodes, 112, 114 and 116, to which the node 110 is linked and the cost of the links to these nodes. The information data unit including the node identifier and the node signature of the node 110 is stored in the database 207 of the node 114. In the event that another node is erroneously assigned the same node identifier as node 110, the network information representation in the database of the node 114 is not valid. In accordance with the invention, it is detected if there is more than one node signature for nodes of the same node identifier by comparing node signatures and one of the nodes with the same node identifier is selected based on the node signatures. Node identifying information may be issued as one of the information data units in the message of FIG. 3 or the node identifying information may be issued as a separate message or may be included in other messages. Information data unit 2 of FIG. 3 may, for example, have only the node identifying information consisting of the assigned node identity and the generated node signature originating from an issuing node.

Figure 6:
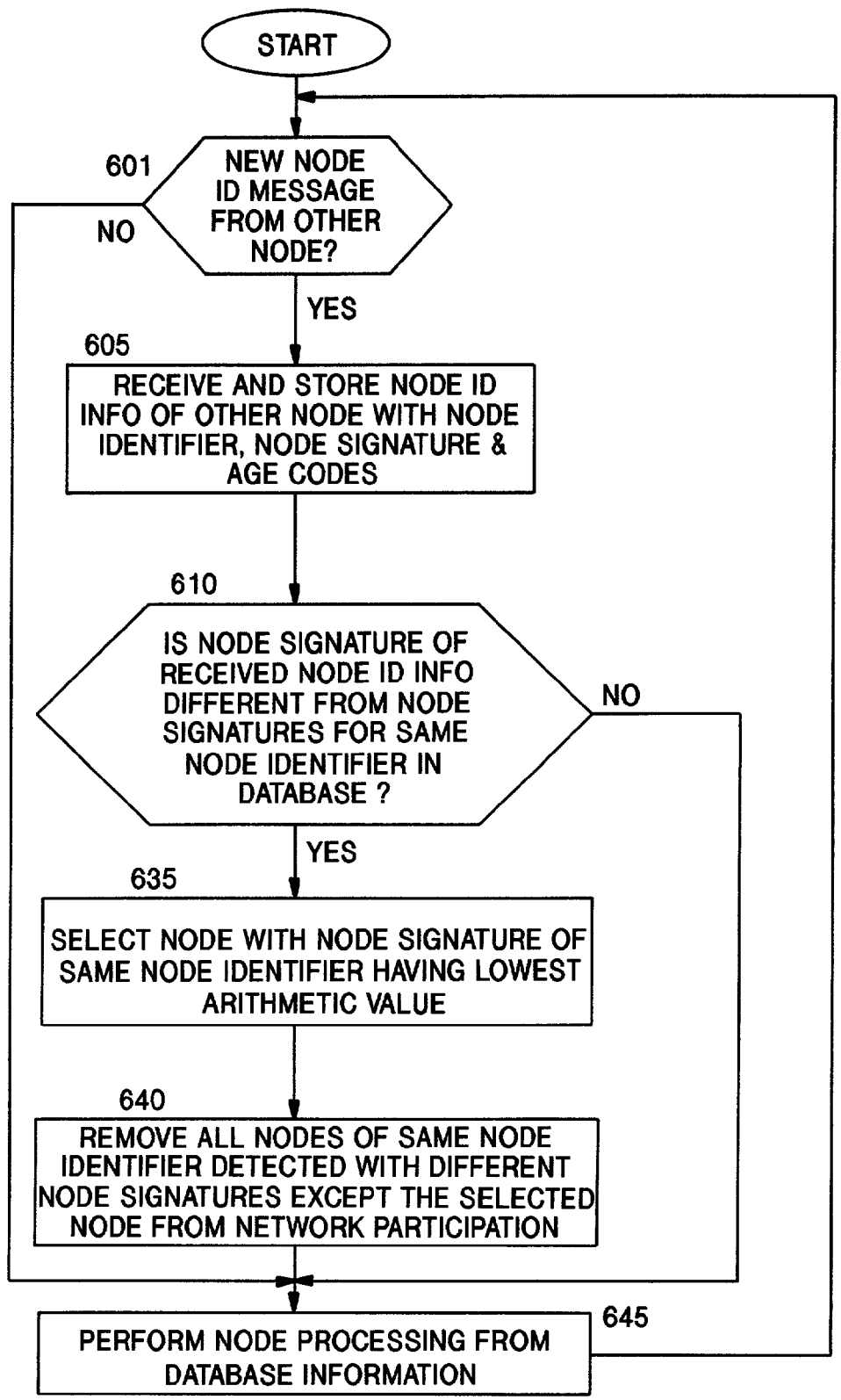
FIG. 6 is a flow chart showing one arrangement for managing of the node identities in the communication network according to the invention.

FIG. 6 is a flow chart corresponding to instruction codes stored in the control memory 203 of a node that illustrates the management of duplicated node identifiers according to the invention. In FIG. 6, whether there is a message with new node identifying information is checked in step 601. Absent such a message, control is passed to step 645 for node processing from the information in the database 207. Upon detection of node identifying information in the step 601, step 605 is entered in which the detected message is received and the node information stored with the assigned node identifier of the issuing node, the node signature of the issuing node and the age indicator of the message.

Control is passed to decision step 610 from the step 605 wherein the CPU 201 operates to compare the node signature in the received message with the node signatures for the same node identifier stored in the receiving node. If it is detected that the node signature in the received message is different from node signatures already stored for the this assigned node identifier in decision step 610, step 635 is entered in which one of the detected nodes is selected for further network participation. The node signatures have numerical values and the node having the node signature with the lowest arithmetic numeric value is selected. Alternatively, the highest arithmetic numeric value may be selected or an ordered list of the numeric values of the node signatures may be generated and the node having a predetermined place in the ordered list may be selected. After the selection in the step 635, the other nodes detected as having the same node identifier but different node signatures are processed to assure that only one node operates with the assigned node identity.

As one alternative for node processing shown in step 640, all nodes of the same node identifier detected with different node signatures are removed from network participation through messaging among the routing nodes of the network. Step 640 may be set to remove all nodes of the same node identifier detected with different node signatures except a selected node from network participation. According to yet another alternative, a flag is set to ignore the information from all nodes of the same node identity detected as having different node signatures or the information from all nodes of the same node identity detected as having different node signatures except a selected node is ignored. The selected node may be the node having the lowest arithmetic value node signature, the highest arithmetic value node signature or the node having its node signature at a prescribed place in an ordered list of node signatures for the nodes having the same node identifier.

Until such time as the messages of nodes of the same node identity detected as having different node signatures reach the end of their limited lifetime, the receiving node continues to maintain the messages having the same node identifiers and different node signatures. If either no new node identifying message has been received in the step 601 or if the received node signature is not detected to be different from the node signatures in the database 207 in the step 610, the decision step 645 is entered from the step 610. In decision step 645, node processing using the node database information is performed. The step 601 is then reentered from the step 645.

Figure 9:
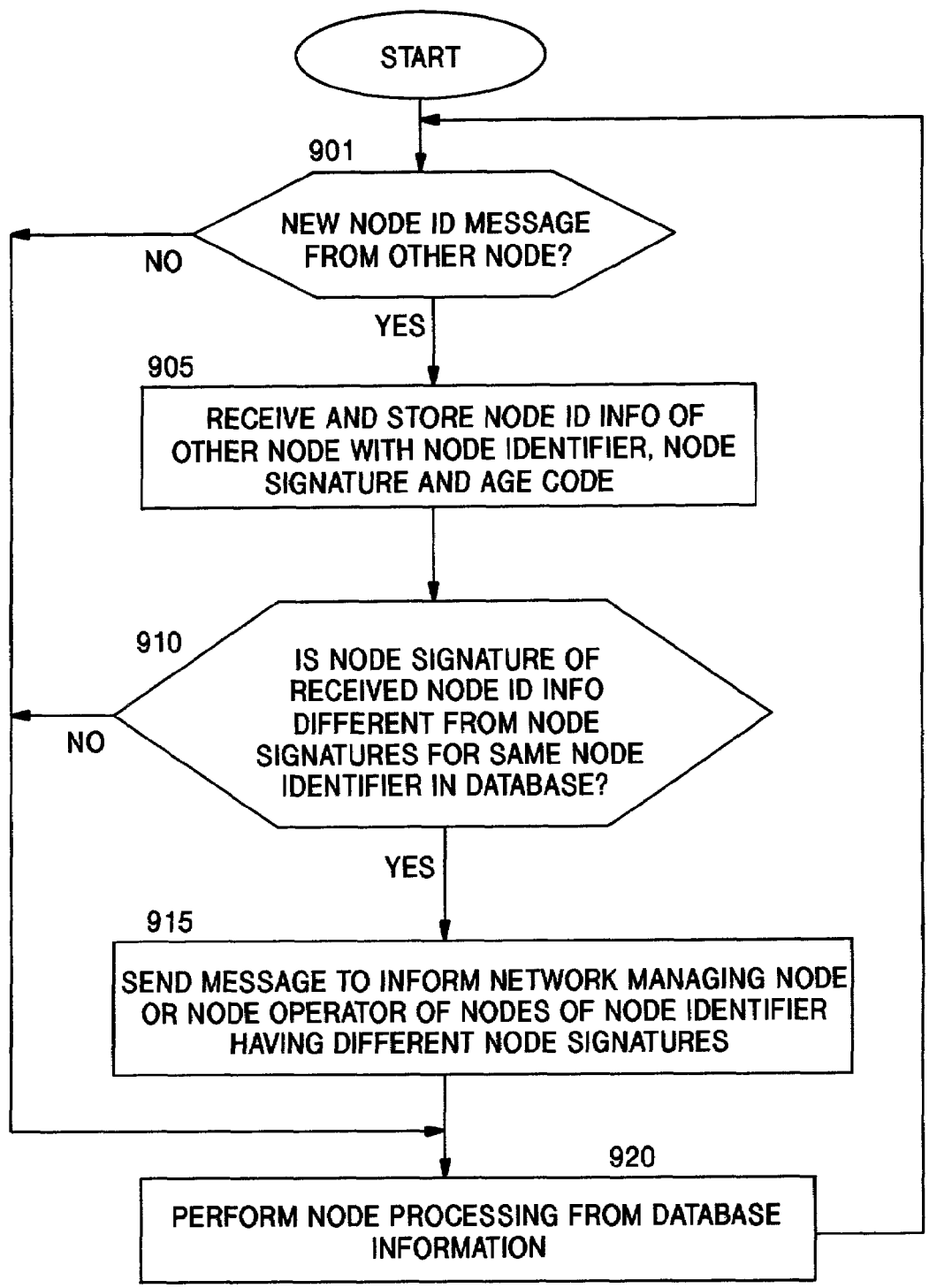
FIG. 9 is a flow chart showing a further arrangement for managing node identities in the communication network of FIG. 1 according to the invention.

FIG. 9 illustrates an arrangement for managing duplicated node identities in which a message is sent from the receiving node to a network management terminal or to a network operator to signal that a duplicated unique node identifier has been detected in the network. In FIG. 9, it is detected in decision step 901 whether a new node identifier message is received from another node. If no, node processing is performed from the node's database information in step 920. If yes, step 905 is entered and the node receives and stores the other node identifier information that includes the other node identifier, the other node's node signature and the age code for the mode identifier message.

Control is passed to decision step 910 and it is decided whether the node signature in the received node identifier message is different from the node signatures for the same node identifier. When all the node signatures for the node identifier are the same, node processing from the node's database information is performed in the step 920. Otherwise, step 915 is entered and a message is sent to inform the network managing node of the nodes having the same node identifier with different node signatures and step 920 is entered. The step 901 is entered from the step 920 according to the processing arrangements of the node, e.g., at a prescribed interrupt.

Figure 7:
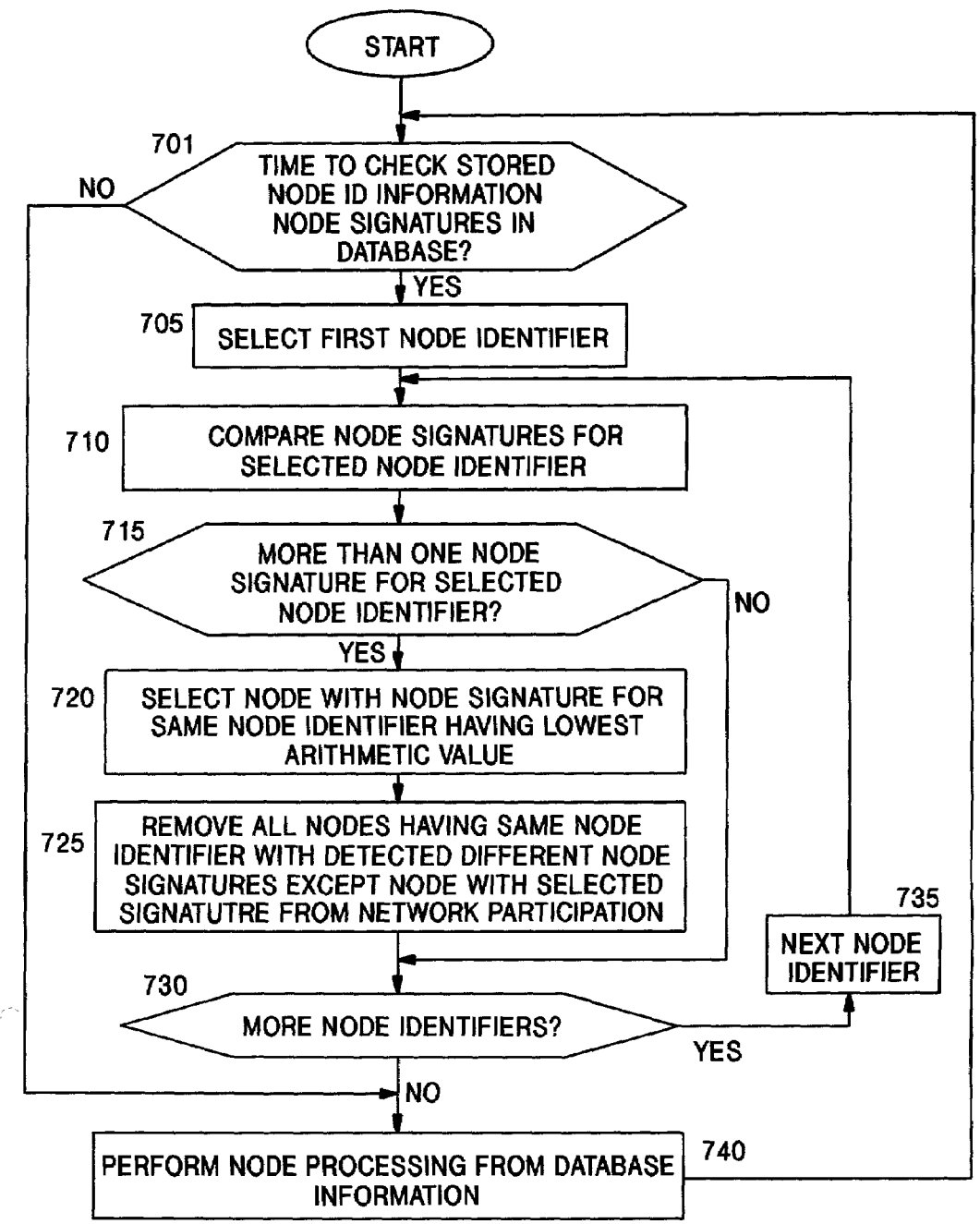
FIG. 7 is a flow chart showing another arrangement for managing node identities in the communication network according to the invention.

In addition to or as an alternative to the checking received node identifying messages as in FIG. 6, the node identity information in the database of each node may be checked periodically. FIG. 7 illustrates an arrangement to detect duplication of unique node identifiers with node signatures and to modify node or network operation in response to such detected duplication. Referring to FIG. 7, it is determined in decision step 701 whether the next time for checking stored node identification information in the node database 207 has arrived. If not, node processing is performed from database information in step 740. Otherwise, a first node identifier in the database is selected in step 705 and the loop including steps 710, 715, 720, 725, 730 and 735 is entered. In the loop, the node signatures for the node identification information of selected node identifier in the database are compared in step 710. When all node signatures for the selected node identifier are determined to be the same in the step 715, control is passed to step 730 in which it is determined whether there are more node identifiers for duplication checking.

Upon detection of more than one node signature for the selected node identifier in the decision step 715, the node with the node signature having the lowest arithmetic value for the selected node identifier is selected in step 720. Step 725 is then entered in which all nodes except the node having the arithmetically lowest value are removed from network participation through messaging. Alternatively, the highest arithmetic numeric value may be selected or an ordered list of the numeric values of the node signatures may be generated and the node having a predetermined place in the ordered list may be selected. As an alternative in the step 725, a flag may be set to ignore information from all nodes having the same node identifier and different node signatures except information from the node with the selected node signature.

As another alternative for the step 725, a flag may be set to ignore all information received from all nodes detected as having the same node identifier but different node signatures by the receiving node. As yet another alternative for the step 725, a message is sent from the receiving node to a network management terminal to signal that a duplicated unique node identifier has been detected in the network. As yet another alternative for the step 725, a signal is sent to an operator or to an automated system to inform of the duplication.

After processing in the step 725, the step 730 is entered wherein it is determined if there are more node identifiers to be checked. If yes in the step 730, the loop including steps 715, 720, 725, 730 and 735 is reentered. When it is detected in the step 730 that there are no more node identifiers to be selected, step 740 is entered and node processing is performed from the database information.

Figure 8:
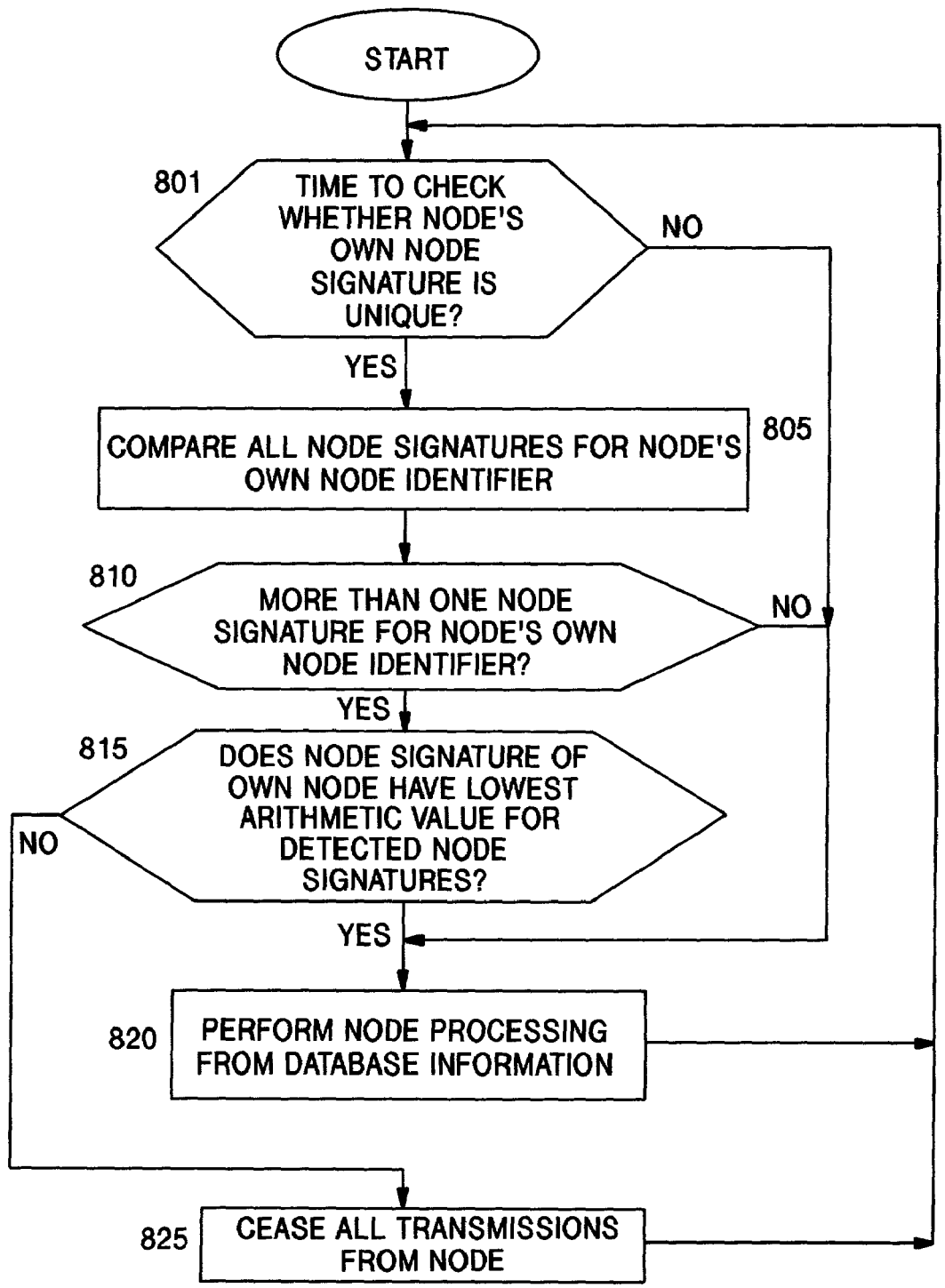
FIG. 8 is a flow chart showing yet another arrangement for managing node identities in the communication network of FIG. 1 according to the invention.

FIG. 8 is a flow chart illustrating the operations of a node in periodically checking if its own node identifier stored in its database has more than one node signatures. In FIG. 8, it is checked whether the next time for checking the uniqueness of its own node identity in the node database has arrived. If not, control is passed to step 820 and node processing is performed from database information. If the time has arrived, processing is performed in steps 805 and 810 in which all node signatures for the node's own node identifier are compared and it is detected whether there is more than one node signature for the node's own node identifier. When all the node signatures for the node's own node identifier are the same, step 820 is entered and node processing is performed from database information.

Detection of more than one node signature for the node's own node identifier in decision step 810 indicates that the node identifier has been assigned to more than one node. It is then determined in the decision step 815 whether the node's own node signature has the lowest arithmetic value of the different node signatures compared in the step 810. If the node's own node signature in the set of the detected different node signatures has the lowest arithmetic value, the step 820 is entered and node processing is performed from database information. Otherwise, step 825 is entered and further transmissions from the node are prevented since the node identification is ambiguous. The step 801 is reentered from either the step 820 or the step 825.

While the invention has been described by way of particular illustrative embodiments, it is to be understood that the invention is not limited to the above-described embodiments but that various changes and modifications may be made by those of ordinary skill in the art without departing from the scope and spirit of the invention. Accordingly, the foregoing embodiments should not be construed as limiting the scope of the invention which is encompassed instead by the following claims.

What is claimed:

1. In a communication network having a plurality of nodes each with an assigned node identifier, a method of checking node identification comprising the steps of:
   generating a node signature for the assigned node identifier in each node of the plurality of nodes;
   distributing from each node, information data including the assigned node identifier and the generated node signatures of the node to other nodes in the communication network;
   in each node, comparing node signatures in the information data having identical node identifiers to detect whether the node signatures of nodes having identical node identifiers are different; and
   modifying operation of the communication network responsive to a detection of different node signatures of nodes having identical node identifiers.

2. The method according to claim 1, wherein the step of generating the node signature for each node of the plurality of nodes comprises generating a code corresponding to an identifier of a component of the node.

3. The method according to claim 1, wherein the step of generating the node signature for each node of the plurality of nodes comprises generating a code corresponding to a quasi-random processing of information received by the node from the network.

4. The method according to claim 1, wherein the step of generating the node signature for each node of the plurality of nodes comprises generating a code corresponding to a timing of a predetermined operation of the node.

5. The method according to claim 1, wherein the step of generating the node signature for each node of the plurality of nodes comprises generating a code corresponding to a sample of information at an interface of the node with the network.

6. The method according to claim 1, wherein the modifying of operation of the network comprises the step of sending a message informing a node for managing network operations of the detection of different node signatures of nodes identical node identifiers.

7. The method according to claim 1, wherein the modifying of operation of the network comprises the step of sending a message informing an operator of the network of the detection of different node signatures of nodes having identical node identifiers.

8. The method according to claim 1, wherein the modifying of operation of the network comprises the step of ignoring information of nodes detected as having different node signatures for identical node identifiers.

9. The method according to claim 1, wherein the step of modifying operation of the communication network comprises selecting one of the nodes of identical node identifiers detected as having different node signatures and ignoring information of the nodes of identical node identifiers detected as having different node signatures except the selected node.

10. The method according to claim 1, wherein the step of modifying operation of the communication network comprises arranging the different node signatures of the nodes of identical node identifiers having different node signatures in an ordered list, selecting the node of the nodes of identical node identifiers detected as having different node signatures with a node signature in a predetermined place in the ordered list, and ignoring information of the nodes of identical node identifiers detected as having different node signatures except the selected node.

11. The method according to claim 1, wherein the generated node signature is a numeric value, further comprising the step of selecting a node with the lowest numeric value node signature of the nodes of identical node identifiers detected as having different node signatures and the step of modifying operation of the network comprises the step of ignoring information of nodes of the identical node identifiers detected as having different node signatures except the information of the selected node.

12. The method according to claim 1, wherein the generated node signature is a numeric value, further comprising the step of selecting a node with the highest numeric value node signature of the nodes of identical node identifiers detected as having different node signatures and the step of modifying operation of the network comprises the step of ignoring information of nodes of identical node identifiers detected as having different node signatures except the selected node.

13. The method according to claim 1, wherein the modifying of operation of the network comprises removing all of the nodes of identical node identifiers having different node signatures from participation in the network.

14. The method according to claim 1, wherein the step of modifying operation of the communication network comprises selecting one of the nodes of identical node identifiers detected as having different node signatures and removing the nodes of identical node identifiers detected as having different node signatures except the selected node from participation in the network.

15. The method according to claim 1, wherein the step of modifying operation of the communication network comprises arranging the different node signatures of the nodes of identical node identifiers having the different node signatures in an ordered list, selecting the node of the nodes of identical node identifiers detected as having different node signatures with a node signature in a predetermined place in the ordered list, and removing the nodes of identical node identifiers detected as having different node signatures except the selected node from participation in the network.

16. The method according to claim 1, wherein the generated node signature is a numeric value and further comprising the step of selecting a node with the lowest numeric value node signature of the nodes of identical node identifiers detected as having different node signatures, and wherein the modifying of operation of the network comprises the step of removing all of the nodes of identical node identifiers having different node signatures except the selected node from participation in the network.

17. The method according to claim 16, wherein the nodes of identical node identifiers having different node signatures except the selected node are removed from participation in the network for a predetermined time.

18. The method according to claim 1, wherein the generated node signature is a numeric value and further comprising the step of selecting a node with the highest numeric value node signature of the nodes of identical node identifiers detected as having different node signatures, and wherein the modifying of operation of the network comprises the step of removing all of the nodes of identical node identifiers having different node signatures except the selected node from participation in the network.

19. The method according to claim 18, wherein the nodes of identical node identifiers having different node signatures except the selected node are removed from participation in the network for a predetermined time.

20. The method of claim 1, wherein the step of comparing node signatures comprises comparing a node signature received from another node to node signatures of information data of nodes of identical node identifiers stored in the node.

21. The method of claim 1, wherein the step of comparing node signatures comprises comparing the node signatures in information data of nodes having identical node identifiers stored in the node.

22. The method of claim 1, wherein the step of comparing node signatures comprises comparing node signatures in information data stored in the node having the node's own node identifier and the step of modifying operation of the communication network comprises ceasing transmitting data from the node when different node signatures for the node's own node identifier are detected.

23. The method of claim 1, wherein the generated node signature is a numeric value, the step of comparing node signatures comprises comparing node signatures in information data stored in the node having the node's own node identifier, and the step of modifying operation of the communication network comprises generating an ordered list of node signatures for the node's own node identifier and ceasing transmitting data from the node when more than one node signature is detected for the node's own node identifier and the numeric value of the node's own node signature is not in a prescribed place in the ordered list.

24. A routing node in a communication network having plural routing nodes each with an assigned node identifier comprising:
   means for generating a node signature for the assigned node identifier in each node;
   means for distributing from each node information data including the assigned node identifier and the generated node signature of the node to other nodes in the communication network;
   means in each node for comparing the node signatures in information data having identical node identifiers to detect whether node signatures of nodes having identical node identifiers are different;
   means for modifying operation of the communication network responsive to a detection of different node signatures for nodes of identical node identifiers.

25. The routing node in a communication network according to claim 24, wherein the means for generating the node signature comprises means for generating a code corresponding to an identifier of a component of the node.

26. The routing node in a communication network according to claim 24, wherein the means for generating the node signature comprises means for generating a code from a quasi-random processing of information received from the network.

27. The routing node in a communication network according to claim 26, wherein the quasi-random processing of information received from the network comprises a hashing process responsive to the received information.

28. The routing node in a communication network according to claim 24, wherein the means for generating the node signature comprises means for generating a code from a timing of a predetermined node event.

29. The routing node according to claim 24, wherein the means for generating the node signature for each node of the plurality of nodes comprises means for generating a code corresponding to a sample of information at an interface of the node with the network.

30. The routing node according to claim 24, wherein the means for modifying of operation of the network comprises means for sending a message informing a node for managing network operations of the detection of different node signatures of nodes having identical node identifiers.

31. The routing node according to claim 24, wherein the means for modifying of operation of the network comprises means for sending a message informing an operator of the network of the detection of different node signatures of nodes having identical node identifiers.

32. The routing node in a communication network according to claim 24, wherein the means for modifying operation of the network comprises means for ignoring information of the nodes of identical node identifiers detected as having different node signatures in processing by the node.

33. The routing node according to claim 24, wherein the means for modifying operation of the communication network comprises means for selecting one of the nodes of identical node identifiers detected as having different node signatures and means for ignoring information of the nodes of identical node identifiers detected as having different node signatures except the selected node.

34. The routing node according to claim 24, wherein the means for modifying operation of the communication network comprises means for arranging the different node signatures of the nodes of identical node identifiers having the different node signatures in an ordered list, means for selecting the node of the nodes of identical node identifiers detected as having different node signatures with a node signature in a predetermined place in the ordered list, and means for ignoring information of the nodes of identical node identifiers detected as having different node signatures except the selected node.

35. The routing node in a communication network according to claim 24, wherein each node signature is a numeric value and further comprising means for selecting a node with the lowest numeric value of the nodes of identical node identifiers detected as having different node signatures and the means for modifying the operation of the network comprises means for ignoring the information of the nodes of identical node identifiers detected as having different node signatures except the selected node in processing of database information of the routing node.

36. The routing node in a communication network according to claim 24, wherein each node signature is a numeric value and further comprising means for selecting a node with the highest numeric value of the nodes of identical node identifiers detected as having different node signatures and the means for modifying the operation of the network comprises means for ignoring the information of the nodes of identical node identifiers detected as having different node signatures except the selected node in processing of database information of the routing node.

37. The routing node in a communication network according to claim 24, wherein the means for modifying operation of the network comprises means for removing the nodes of identical node identifiers detected as having different node signatures from participation in the network.

38. The routing node according to claim 24, wherein the means for modifying operation of the communication network comprises means for selecting one of the nodes of identical node identifiers detected as having different node signatures and means for removing the nodes of identical node identifiers detected as having different node signatures except the selected node from participation in the network.

39. The routing node according to claim 24, wherein the means for modifying operation of the communication network comprises means for arranging the different node signatures of the nodes of identical node identifiers having the different node signatures in an ordered list, means for selecting a node of the nodes of identical node identifiers detected as having different node signatures with a node in a predetermined place in the ordered list, and removing all of the nodes of identical node identifiers having different node signatures except the selected node from participation in the network.

40. The routing node in a communication network according to claim 24, wherein the generated node signature is a numeric value and further comprising means for the node with the lowest numeric value node of the nodes of identical node identifiers detected different node signatures, and the means for operation of the network comprises means for removing all of the nodes of identical node identifiers detected as having different node signatures except the selected node from participation in the network.

41. The routing node in a communication network to claim 40, wherein the means for removing all of the nodes of identical node identifiers detected as having node signatures except the selected node comprises means for removing all of the nodes of identical node identifiers detected having different the selected node signatures except the selected node from participation in the network for a predetermined time.

42. The routing node in a communication network according to claim 24, wherein each node signature is a numeric value and further comprising means for selecting a node with the highest numeric value of the nodes of identical node identifiers detected as having different node signatures and the means for modifying the operation of the network comprises means for removing all of the nodes of identical node identifiers having different node signatures except the selected node from participation in the network.

43. The routing node in a communication network according to claim 42, wherein the means for removing all of the nodes of identical node identifiers detected as having different node signatures except the selected node comprises means for removing all of the nodes of identical node identifiers detected having different node signatures except the selected node from participation in the network for a predetermined time.

44. The routing node in a communication network according to claim 24, wherein the means for comparing node signatures comprises means for comparing a node signature in information data received from another node to node signatures in information data stored in the node receiving the information data having identical node identifiers.

45. The routing node in a communication network according to claim 24, wherein the means for comparing node signatures comprises means for comparing node signatures in the information data stored in the node for nodes which have identical node identifiers.

46. The routing node in a communication network according to claim 24, wherein the means for comparing node signatures comprises means for comparing node signatures in information data stored in the node of nodes having the node's own node identifier and the means for modifying operation of the communication network comprises means for ceasing transmitting data from the node when different node signatures are detected for nodes having the node's own node identifier.

47. The routing node in a communication network according to claim 24, wherein the generated node signature is a numeric value, the means for comparing node signatures comprises means for comparing node signatures for the node's own node identifier, and the means for modifying operation of the communication network comprises means for generating an ordered list of the node signatures for the node's own node identifier and means for ceasing transmitting data from the node when different node signatures are detected for nodes with the node's own node identifier and the numeric value of the node's own node signature is not in a prescribed place in the ordered list.

48. In a communication network having a plurality of routing nodes each with an assigned node identifier, a computer usable medium in each routing node having computer readable program units embodied therein comprising:
   a first program code unit for generating a node signature for the assigned node identifier in each node;
   a second program code unit for distributing from each node information data including the assigned node identifier and the generated node signature of the node to other nodes in the communication network;
   a third program code unit in each node for comparing the node signatures in the information data having identical node identifiers to detect whether node signatures of nodes having identical node identifiers are different; and
   a fourth program code unit for modifying operation of the communication network responsive to a detection of different node signatures of nodes having identical assigned node identifiers.

49. In the communication network having the plurality of routing nodes each with an assigned node identifier, the computer usable medium in each routing node having computer readable program units embodied therein according to claim 48, wherein the first program code unit comprises a program code unit for generating a code corresponding to an identifier of a component of the node.

50. In the communication network having the plurality of routing nodes each with an assigned node identifier, the computer usable medium in each routing node having computer readable program units embodied therein according to claim 48, wherein the first program code unit comprises a program code unit for generating a code corresponding to a quasi-random processing of information received by the node from the network.

51. In the communication network having the plurality of routing nodes each with an assigned node identifier, the computer usable medium in each routing node having computer readable program units embodied therein according to claim 48, wherein the first program code unit comprises a program code unit for generating a code corresponding to a timing of a predetermined operation of the node.

52. In the communication network having the plurality of routing nodes each with an assigned node identifier, the computer usable medium in each routing node having computer readable program units embodied therein according to claim 48, wherein the first program code unit comprises a program code unit for generating a code corresponding to a sample of information at an interface of the node with the network.

53. In the communication network having the plurality of routing nodes each with an assigned node identifier, the computer usable medium in each routing node having computer readable program units embodied therein according to claim 48, wherein the fourth program code unit comprises' a program code unit for sending a message informing a node for managing network operations of the detection of different node signatures of nodes having identical node identifiers.

54. In the communication network having the plurality of routing nodes each with an assigned node identifier, the computer usable medium in each routing node having computer readable program units embodied therein according to claim 48, wherein the fourth program code unit comprises a program unit for sending a message informing an operator of the network of the detection of different node signatures of nodes having identical node identifiers.

55. In the communication network having the plurality of routing nodes each with an assigned node identifier, the computer usable medium in each routing node having computer readable program units embodied therein according to claim 48, wherein the fourth program code unit comprises a program code unit for ignoring information of nodes of identical node identifiers detected as having different node signatures.

56. In the communication network having the plurality of routing nodes each with an assigned node identifier, the computer usable medium in each routing node having computer readable program units embodied therein according to claim 48, wherein the fourth program code unit comprises a program code unit for selecting one of the nodes of identical node identifiers detected as having different node signatures and ignoring information of the nodes of identical node identifiers detected as having different node signatures except the selected node.

57. In the communication network having the plurality of routing nodes each with an assigned node identifier the computer usable medium in each routing node having computer readable program units embodied therein according to claim 48, wherein the fourth program code unit comprises a program code unit for arranging the different node signatures of the nodes of identical node identifiers having different node signatures in an ordered list, selecting the node of the nodes of identical node identifiers detected as having different node signatures with a node signature in a predetermined place in the ordered list, and ignoring information of the nodes of identical node identifiers detected as having different node signatures except the selected node.

58. In the communication network having the plurality of routing nodes each with an assigned node identifier, the computer usable medium in each routing node having computer readable program units embodied therein according to claim 48, wherein the generated node signature is a numeric value, further comprising a program code unit for selecting the node with the lowest numeric value node signature of the nodes of identical node identifiers detected as having different node signatures and the fourth program code unit comprises a program code unit for ignoring information of nodes of identical node identifiers detected as having different node signatures except the information of the selected node.

59. In the communication network having the plurality of routing nodes each with an assigned node identifier, the computer usable medium in each routing node having computer readable program units embodied therein according to claim 48, wherein the generated node signature is a numeric value, the fourth program code unit comprises a program code unit for selecting a node with the highest numeric value node signature of the nodes of identical node identifiers detected as having different node signatures and a program code unit for ignoring information of nodes of identical node identifiers detected as having different node signatures except the information of the selected node.

60. In the communication network having the plurality of routing nodes each with an assigned node identifier, the computer usable medium in each routing node having computer readable program units embodied therein according to claim 48, wherein the fourth program code unit comprises a program code unit for removing all of the nodes of identical node identifiers having different node signatures from participation in the network.

61. In the communication network having the plurality of routing nodes each with an assigned node identifier, the computer usable medium in each routing node having computer readable program units embodied therein according to claim 48, wherein the fourth program code unit comprises a program code unit for selecting one of the nodes of identical node identifiers detected as having different node signatures and a program code unit for removing the nodes of identical node identifiers detected as having different node signatures except the selected node from participation in the network.

62. In the communication network having the plurality of routing nodes each with an assigned node identifier, the computer usable medium in each routing node having computer readable program units embodied therein according to claim 48, wherein the fourth program code unit comprises a program code unit for arranging the different node signatures of the nodes of identical node identifiers having the different node signatures in an ordered list, a program code unit for selecting the node of the nodes of identical node identifiers detected as having different node signatures with a node signature in a predetermined place in the ordered list, and a program code unit for removing the nodes of identical node identifiers detected as having different node signatures except the selected node from participation in the network.

63. In the communication network having the plurality of routing nodes each with an assigned node identifier, the computer usable medium in each routing node having computer readable program units embodied therein according to claim 48, wherein the generated node signature is a numeric value, and further comprising a program code unit for selecting the node with the lowest numeric value node signature of the nodes of identical node identifiers detected as having different node signatures and wherein the fourth program code unit comprises a fifth program code unit for removing all of the nodes of identical node identifiers detected as having different node signatures except the selected node from participation in the network.

64. In the communication network having the plurality of routing nodes each with an assigned node identifier, the computer usable medium in each routing node having computer readable program units embodied therein according to claim 63, wherein the fifth program code unit removes the nodes of identical node identifiers detected as having different node signatures except the selected node from participation in the network for a predetermined time.

65. In the communication network having the plurality of routing nodes each with an assigned node identifier, the computer usable medium in each routing node having computer readable program units embodied therein according to claim 48, wherein the generated node signature is a numeric value and the fourth program code unit comprises a program code unit for selecting a node with the highest numeric value node signature of the nodes of identical node identifiers detected as having different node signatures, and a program code unit for removing all of the nodes of identical node identifiers having different node signatures except the selected node from participation in the network.

66. In the communication network having the plurality of routing nodes each with an assigned node identifier, the computer usable medium in each routing node having computer readable program units embodied therein according to claim 65, wherein program code unit for removing all of the nodes of identical node identifiers having different node signatures except the selected node from participation in the network comprises a program code unit for removing the nodes of identical node identifiers having different node signatures except the selected node from participation in the network for a predetermined time.

67. In the communication network having the plurality of routing nodes each with an assigned node identifier, the computer usable medium in each routing node having computer readable program units embodied therein according to claim 48, wherein the third program code unit comprises a program code unit for comparing a node signature of information data received from another node with node signatures stored in the node having identical node identifiers as the received information data.

68. In the communication network having the plurality of routing nodes each with an assigned node identifier the computer usable medium in each routing node having computer readable program units embodied therein according to claim 48, wherein the third program code unit comprises a program code unit for comparing node signatures in information data of nodes of identical node identifiers that are stored in the node.

69. In the communication network having the plurality of routing nodes each with an assigned node identifier, the computer usable medium in each routing node having computer readable program units embodied therein according to claim 48, wherein the third program code unit comprises a program code unit for comparing node signatures in information data stored in the node with the node's own signatures and the fourth program code unit comprises a program code unit for ceasing transmitting data from the node when different node signatures for the node's own node identifier are detected.

70. In the communication network having the plurality of routing nodes each with an assigned node identifier, the computer usable medium in each routing node having computer readable program units embodied therein according to claim 48, wherein the generated node signature is a numeric value, the third program code unit comprises a program code unit for comparing node signatures in information data stored in the node having the node's own node identifier, and the fourth program code unit comprises a program unit for generating an ordered list of the node signatures for the node's own node identifier and a program code unit for ceasing transmitting data from the node when different node signatures are detected for the node's own node identifier and the numeric value of the node's own node signature is not in a prescribed place in the ordered list.

* * * * *